United States Patent
Imamura et al.

(10) Patent No.: US 9,738,043 B2
(45) Date of Patent: Aug. 22, 2017

(54) TIRE VULCANIZING APPARATUS

(71) Applicant: Sumitomo Rubber Industries, Ltd., Kobe-shi, Hyogo (JP)

(72) Inventors: Ao Imamura, Kobe (JP); Masaya Tsunoda, Kobe (JP); Shinji Kuchiki, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/287,855

(22) Filed: Oct. 7, 2016

(65) Prior Publication Data
US 2017/0100904 A1    Apr. 13, 2017

(30) Foreign Application Priority Data

Oct. 8, 2015 (JP) ................. 2015-200416

(51) Int. Cl.
*B29D 30/06* (2006.01)
*B29C 35/16* (2006.01)

(52) U.S. Cl.
CPC ..... *B29D 30/0643* (2013.01); *B29D 30/0654* (2013.01); *B29D 30/0662* (2013.01); *B29C 35/16* (2013.01); *B29D 30/0606* (2013.01); *B29D 2030/0667* (2013.01)

(58) Field of Classification Search
CPC ............... B29D 30/0606; B29D 30/72; B29D 2030/0666; B29D 2030/0667; B29D 2030/067; B29D 30/0654; B29D 30/0662; B29C 35/04; B29C 35/16; B29C 2035/048; B29C 2035/1683
See application file for complete search history.

(56) References Cited

U.S. PATENT DOCUMENTS

| | | | | |
|---|---|---|---|---|
| 1,544,002 A | * | 6/1925 | Grove | B29D 30/0606 425/40 |
| 2,672,914 A | * | 3/1954 | Weigold et al. | B29C 47/065 156/125 |
| 2,763,317 A | * | 9/1956 | Ostling | B29D 30/0645 156/123 |
| 5,173,308 A | * | 12/1992 | Scantland | B29C 33/04 249/79 |
| 2009/0162460 A1 | * | 6/2009 | Dumont | B29D 30/72 425/35 |
| 2011/0180958 A1 | * | 7/2011 | Goumault | B29C 33/04 264/236 |

FOREIGN PATENT DOCUMENTS

JP    2013-237199 A    11/2013

* cited by examiner

*Primary Examiner* — James Mackey
(74) *Attorney, Agent, or Firm* — Birch, Stewart, Kolasch & Birch, LLP

(57) ABSTRACT

An apparatus for vulcanizing a tire comprises: a side mold segment provided with a face for shaping the outer surface of a tire sidewall portion, and an opposite face not serving for shaping; and a heater part for vulcanizing the raw tire. The heater part is disposed adjacently to the side mold segment to heat the raw tire abutting on the side-shaping-face from the side of the face not serving for shaping. The side mold segment is provided with a flow path through which a first fluid whose temperature is lower than the vulcanization temperature of the raw tire can flow to prevent over-vulcanization of the sidewall portion.

4 Claims, 5 Drawing Sheets

TIRE VULCANIZING APPARATUS

TECHNICAL FIELD

The present invention relates to a tire vulcanizing apparatus for vulcanization-molding a raw tire.

BACKGROUND ART

The following patent document 1 discloses a tire vulcanizing apparatus comprising a side mold segment, a tread mold segment, and a heater part. The side mold segment has a side-shaping-face for shaping the outer surface of the tire sidewall portions. The tread mold segment is for shaping the outer surface of the tire tread portion. The heater part is for heating the side mold segment and the tread mold segment to vulcanize the raw tire. The vulcanization apparatus is provided in the side mold segment with a void space extending along the side-shaping-face. Such void space can reduce the heat transfer from the heater part to the sidewall portion. Thereby, the tread portion having a larger thickness and the sidewall portion having a smaller thickness can be vulcanized evenly.

However, even in such tire vulcanizing apparatus, if the vulcanizing time is long, the temperature of the void space becomes increased near to the vulcanization temperature, and the heat transfer to the sidewall portion can not be reduced. As a result, there is a possibility that the sidewall portion is over-vulcanized. Therefore, in the tires manufactured by the use of such tire vulcanizing apparatus, there is a problem with the durability and rolling resistance.
Patent document 1: Patent Application Publication No. 2013-237199

SUMMARY OF THE INVENTION

The present invention was, therefore, made with the view toward the above-mentioned actual circumstances, and a primary object is to provide a tire vulcanizing apparatus in which, by improving the side mold segment, the over-vulcanization of the tire sidewall portions can be certainly prevented.

According to the present invention, an apparatus for vulcanizing a tire comprises:

a side mold segment provided with a side-shaping-face for shaping the outer surface of a sidewall portion of the tire, and a face being opposite to the side-shaping-face and not serving for shaping, and a heater part for vulcanizing the raw tire, the heater part disposed adjacently to the side mold segment to heat the raw tire abutting on the side-shaping-face from the side of the face not serving for shaping, wherein the side mold segment is provided therein with a flow path comprising a supply port portion for being supplied with a first fluid whose temperature is lower than the vulcanization temperature of the raw tire, a discharge port portion for discharging the first fluid, and a main portion extending between the supply port portion and the discharge port portion.

The apparatus for vulcanizing a tire according to the present invention preferably comprises a rubber bladder which is inflatable to shape the inner surface of the raw tire, and a supply path which is for supplying to the rubber bladder a second fluid for inflating the rubber bladder, and to which the discharge port portion is connected.

In the apparatus for vulcanizing a tire according to the present invention, it is preferable that the main portion of the flow path extends circumferentially of the tire along the side-shaping-face.

In the apparatus for vulcanizing a tire according to the present invention, it is preferable that the flow path is formed by a groove denting from the face not serving for shaping toward the side-shaping-face.

In the apparatus for vulcanizing a tire according to the present invention, it is preferable that the first fluid is nitrogen gas whose pressure is not less than 2 MPa.

Therefore, in the tire vulcanizing apparatus according to the present invention, the heat transfer from the heater part to the sidewall portion through the side mold segment can be reduced. Thus, the over-vulcanization of the sidewall portion having a relatively small thickness can be surely prevented, and the tire manufactured by the use of the tire vulcanizing apparatus can exert high durability and good rolling resistance.

DESCRIPTION OF THE PREFERRED EMBODIMENTS

Embodiments of the present invention will now be described in detail in conjunction with the accompanying drawings.

According to the present invention, an apparatus 1 for vulcanizing a tire (or tire vulcanizing apparatus 1) comprises a vulcanizing mold system 2 and a bladder system 3.
The tire vulcanizing apparatus 1 is for vulcanization-molding a raw tire Ta disposed in the vulcanizing mold system 2 by heating the raw tire Ta from the outside of the tire by the vulcanizing mold system 2 and also from the inside of the tire by the bladder system 3.

Figure 1:
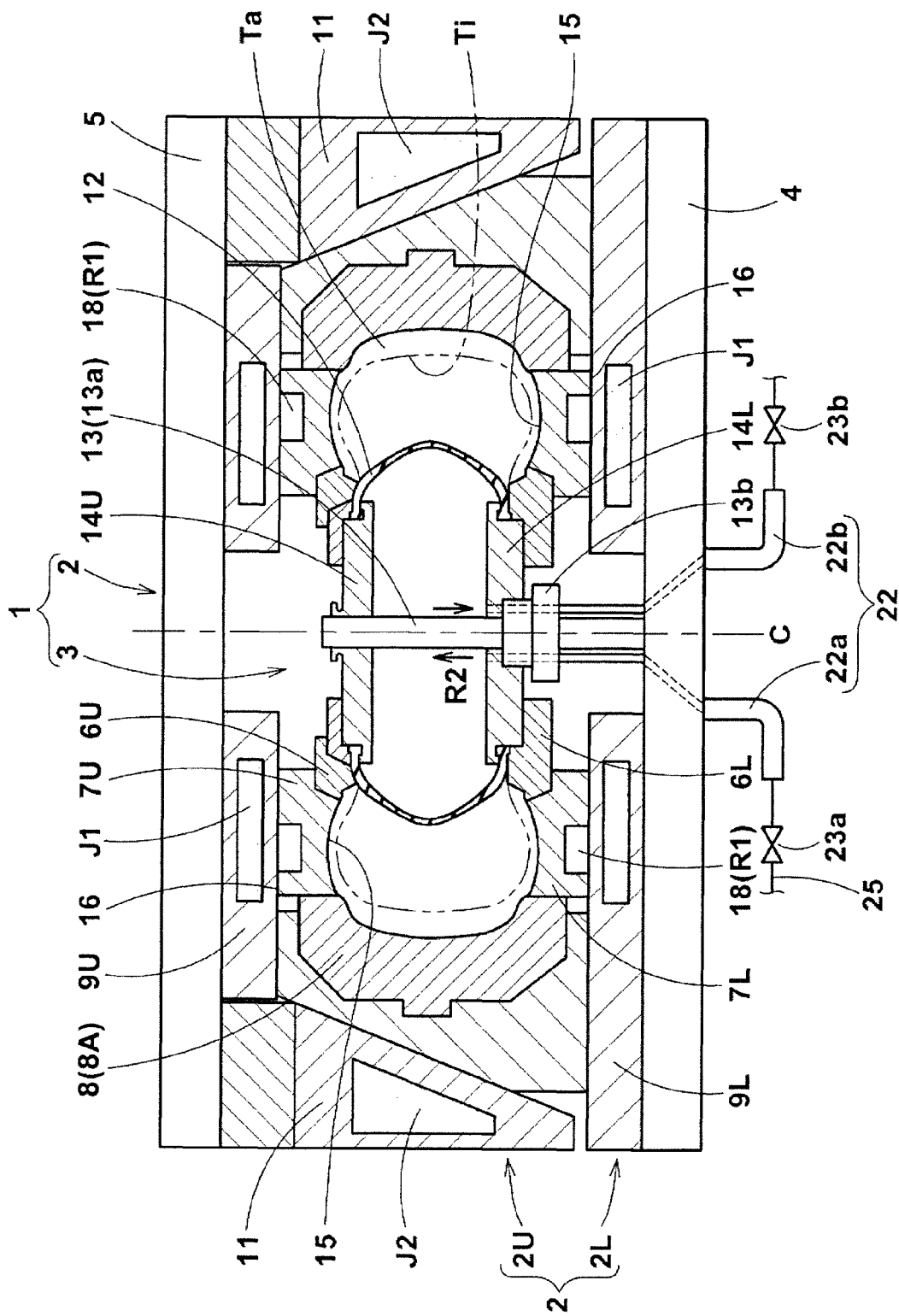
FIG. 1 is a cross sectional view of a tire vulcanizing apparatus as an embodiment of the present invention.
Figure 2:
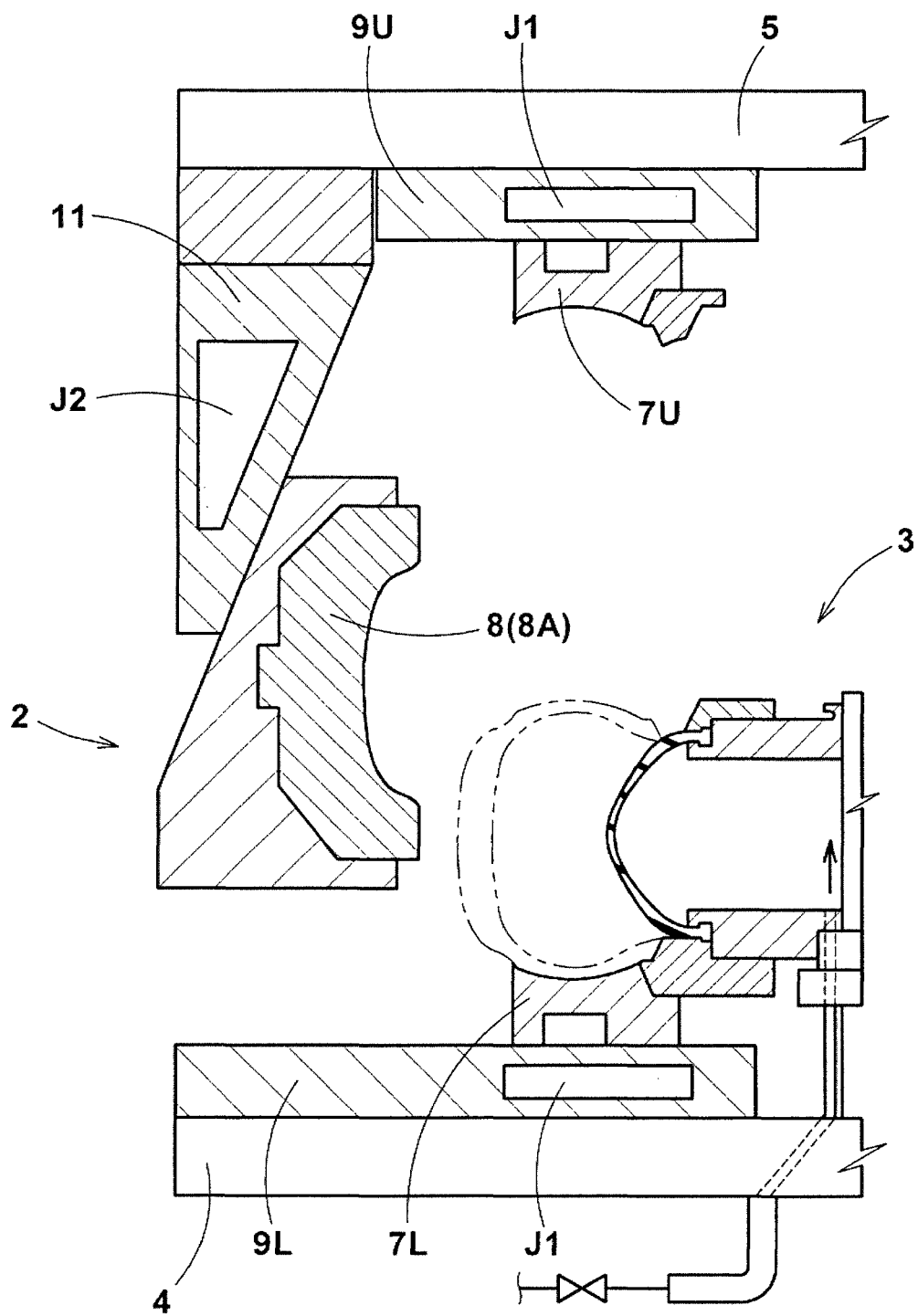
FIG. 2 is a cross sectional partial view of the tire vulcanizing apparatus showing its opened state for accepting the raw tire.

In the embodiment shown in FIG. 1 and FIG. 2, the vulcanizing mold system 2 comprises a lower mold section 2L and an upper mold section 2U which are respectively provided on a lower plate 4 and an upper plate 5 for supporting use.
The upper mold section 2U is movable up-and-down relatively to the lower mold section 2U.
For that purpose, for example, the lower plate 4 is supported fixedly by a table (not shown) of a pressing machine, and the upper plate 5 is supported movably up-and-down by a lifting device (not shown).

The lower mold section 2L comprises a lower bead ring 6L for shaping one of the bead portions of the raw tire Ta, and a lower side mold segment 7L for shaping one of the sidewall portions of the raw tire Ta.

The upper mold section 2U comprises an upper bead ring 6U for shaping the other bead portion of the raw tire Ta, an upper side mold segment 7U for shaping the other sidewall portion of the raw tire Ta, and
a tread mold segment 8 for shaping the tread portion of the raw tire Ta.

In this embodiment, the lower side mold segment 7L is adjacently mounted on a lower platen 9L fixed to the lower plate 4, and
the upper side mold segment 7U is adjacently mounted on an upper platen 9U fixed to the upper plate 5.
But, the upper and lower side mold segments 7U and 7L may be indirectly mounted on the upper and lower platens 9U and 9L through plates (not shown).

In this embodiment, the upper and lower platens 9U and 9L are each provided therein with a first heater part J1 for heating the adjacent sidewall portion of the raw tire Ta.
Thus, by the heat of the first heater parts 31, the upper and lower platens 9U and 9L are heated, and the upper and lower side mold segments 7U and 7L are heated by the heat transfer, then the sidewall portions of the raw tire Ta are heated to be vulcanized.

Figure 3A:
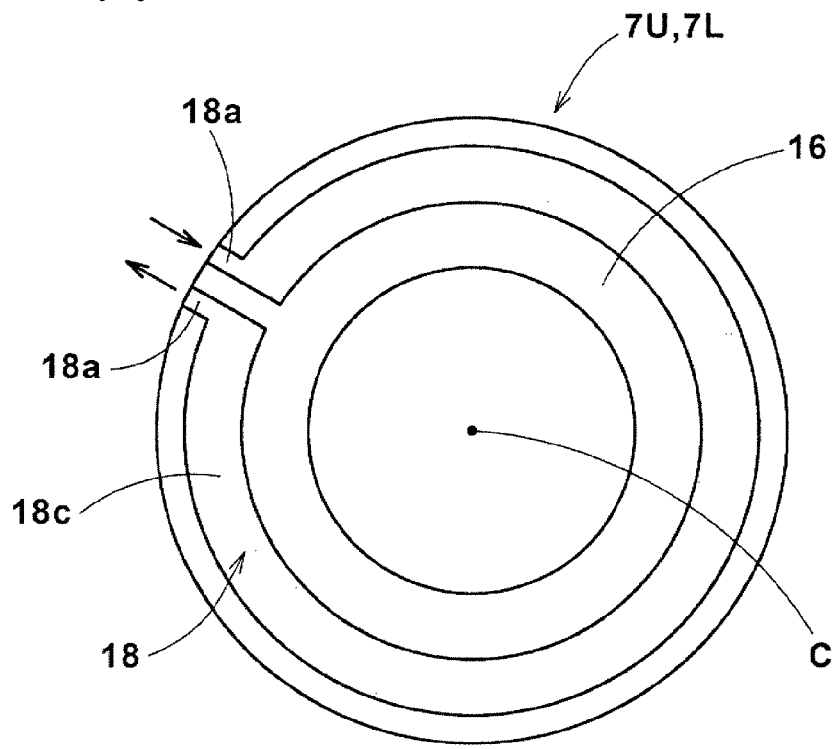
FIG. 3(a) is a schematic plan view of the side mold segment showing a configuration of the flow path.
Figure 3B:
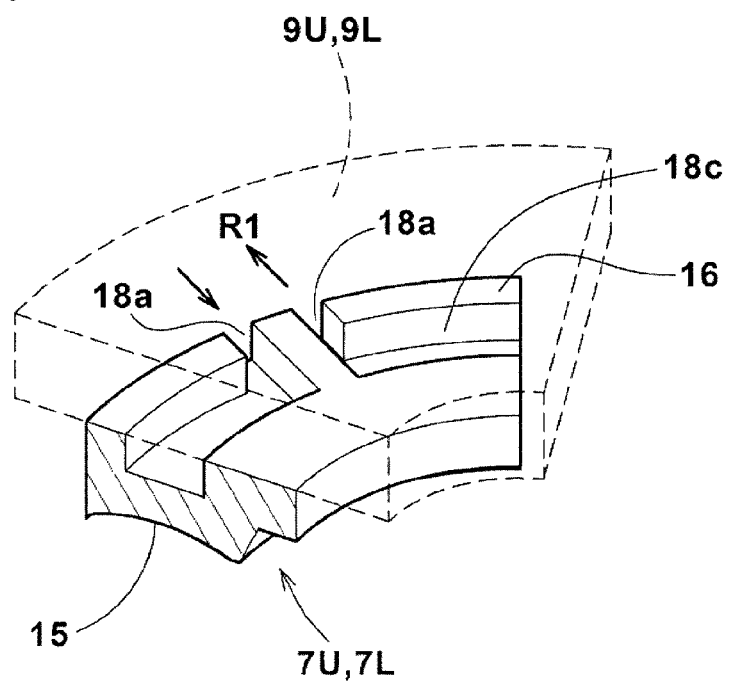
FIG. 3(b) is a partial perspective view of the side mold segment showing the supply port portion and the discharge port portion of the flow path.

The first heater part 31 in this example is a steam jacket employing steam (saturated water vapor) as the heating medium v. In this embodiment, for example, the steam is supplied to each heater part J1 via a heated flow channel 20 (shown in FIG. 4) extended from a heating medium supply source B such as a steam generator placed on the outside of the tire vulcanizing apparatus 1.
The high-temperature and pressure steam such as 200 deg.C and 1.5 MPa is preferred.
Incidentally, as the first heater part J1, an electrical heater and the like may be used instead of the steam heater As schematically shown in FIGS. 3(a) and 3(b), each of the upper and lower side mold segments 7U and 7L is annular and provided with a side-shaping-face 15 for shaping the outer surface of the tire sidewall portion, and a face 16 being opposite to the side-shaping-face 15 and not serving for shaping (hereinafter the "face not serving for shaping" 16).
During vulcanizing the tire, the side-shaping-face 15 contacts with the sidewall portion of the raw tire Ta, and the face not serving for shaping 16 does not contact with the raw tire Ta.

The upper and lower side mold segments 7U and 7L are each provided with a first flow path 18 for a first fluid (cooling medium) R1 whose temperature is lower than the vulcanization temperature of the tire.

The first flow path 18 comprises a main portion 18c, a supply port portion 18a, and a discharge port portion 18b. The main portion 18c extends in the circumferential direction of the side mold segment 7U, 7L along an almost entire circumferential length.
The supply port portion 18a communicates with one end of the main portion 18c to supply the first fluid R1 to the main portion 18c in the side mold segment 7U, 7L.
The discharge port portion 18b communicates with the other end of the main portion 18c to discharge the first fluid R1 from the main portion 18c in the side mold segment 7U, 7L.
The first fluid R1 flowing through the first flow path 18 can reduce the heat transfer from the side mold segments to the tire sidewall portions in order to prevent the over-vulcanization of the relatively thin sidewall portions. Thus, the tire manufactured by the use of the tire vulcanizing apparatus 1 can exert high durability and good rolling resistance.

The first flow path 18 in this example is formed by a groove which dents from the face not serving for shaping 16 toward the side-shaping-face 15 and which is closed by the platen 9U, 9L. Namely, the first flow path 18 is disposed at a position close to the first heater part J1 in order to effectively control the heat transfer.
The main portion 18c of the first flow path 18 is disposed at a position corresponding to a part of the tire sidewall portion which part is in the vicinity of the maximum tire section width position and in which part the thickness is relatively small.

The temperature of the first fluid R1 supplied to the supply port portion 18a is, for example, about 30 deg.C. Of course, 30 deg.C. is not essential.

As to the first fluid R1, nitrogen gas is preferably used, and the pressure is, for example, not less than 2 MPa. Thereby, the side mold segments 7U and 7L can be prevented from corrosion by rusting for example, and the first fluid R1 can smoothly flow through the first flow path 18.

Figure 4:
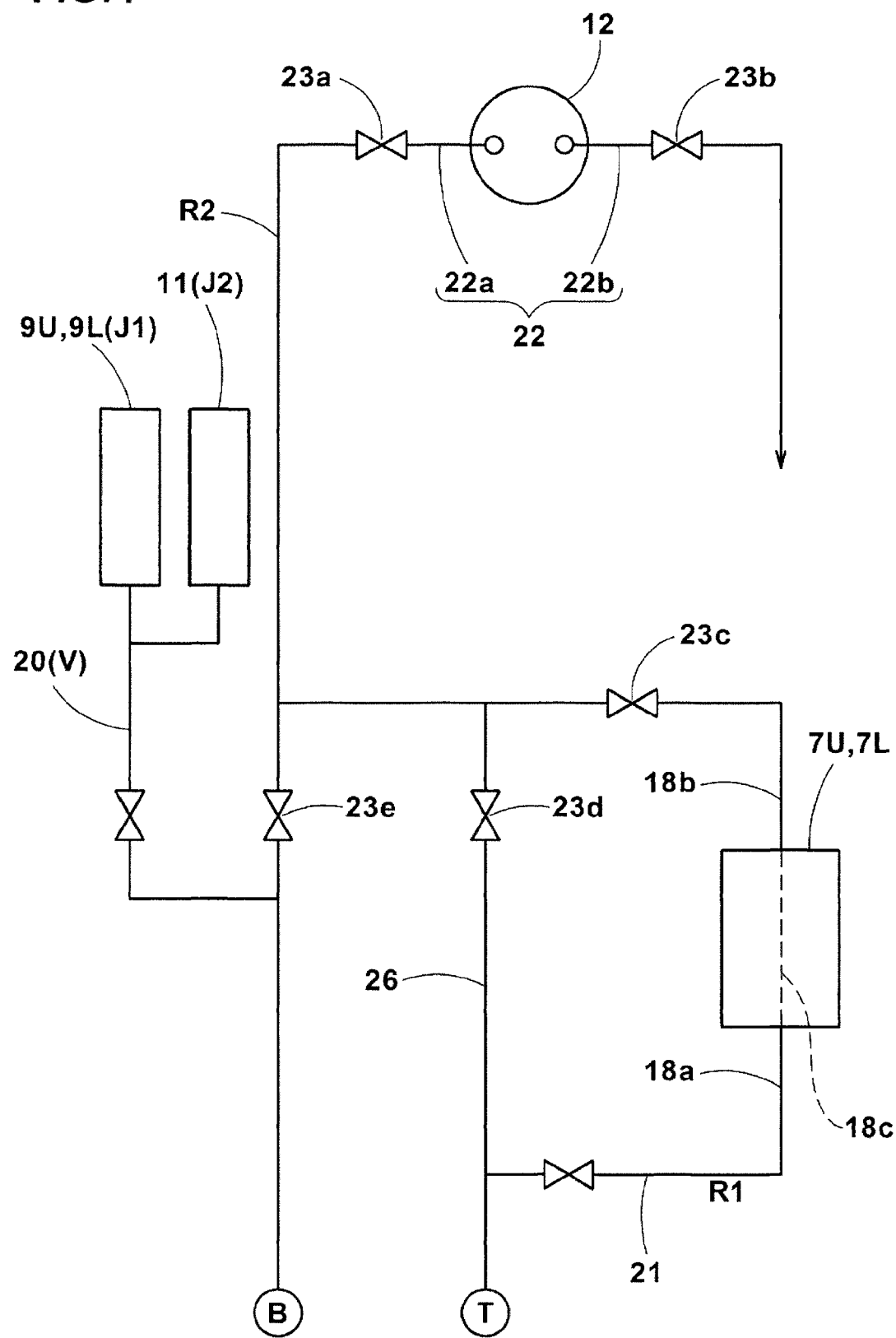
FIG. 4 is a flow path connection diagram of the tire vulcanizing apparatus show in FIG. 1.

The first fluid R1 is supplied from a supply device T, for example, placed on the outside of the apparatus 1 to the first flow path 18 through a main flow path 21 (shown in FIG. 4).

In order that the first fluid R1 effectively receives the heat from the side mold segment, it is preferred that the flow of the first fluid R1 in the first flow path 18 is a turbulent flow whose Reynolds number is not less than 5000.

Incidentally, the first flow path 18 may be provided in the upper and lower platens 9U and 9L in addition to the side mold segments in order to further draw the heat transferred from the first heater part J1.

The tread mold segment 8 is supported movably up and down by an actuator 11 mounted on the upper plate 5.
The tread mold segment 8 is annular and made up of sector segments 8A divided in the circumferential direction.
In the contracted state Y1 of the tread mold segment 8 (shown in FIG. 1), the sector segments 8A are moved downward and moved toward the radially inside by the actuator 11, and the circumferentially adjacent sector segments 8A contact with each other and become annular.
In the expanded state (opened state) Y2 of the tread mold segment 8 (shown in FIG. 2), the sector segments 8A are moved upward and moved toward the radially outside by the actuator 11, and the sector segments 8A are circumferentially separated from each other.

The actuator 11 is an annular body disposed concentrically with a center axis (c) of the vulcanizing mold system 2 so as to surround the tread mold segment 8.
The actuator 11 is provided therein with a second heater part J2 for heating the tread portion of the raw tire Ta.
The heat from the second heater part J2 is transferred to the tread mold segment 8 through the actuator 11, and the tread portion of the raw tire Ta is heated.
The second heater part J2 in this example is a steam jacket using the heating medium V supplied by the above-mentioned heating medium supply source B as shown in FIG. 4.

The above-mentioned bladder system 3 is disposed at the center of the vulcanizing mold system 2.
In this embodiment, as shown in FIG. 1 and FIG. 2, the bladder system 3 comprises: a center post 13; a rubber bladder 12 disposed around the center post 13 and having a lower opening and an upper opening; a lower clamp ring 14L for holding the inner peripheral edge of the lower opening of the rubber bladder 12; an upper clamp ring 14U for holding the inner peripheral edge of the upper opening of the rubber bladder 12; and a second flow path 22.

The center post 13 extends upward from the above-mentioned lower plate 4 concentrically with the center axis (c) of the vulcanizing mold system 2.

The lower clamp ring 14L and the upper clamp ring 14U are mounted on the center post 13.

The center post 13 in this embodiment is movable up-and-down relatively to the lower plate 4 by a lifting and lowering device (not shown), therefore, the lower clamp ring 14L and the upper clamp ring 14U are movable up-and-down together.

The center post 13 comprises a disc 13b at a lower position of the center post 13, and a shaft 13a extending upward from the disk 13b.

The upper clamp ring 14U is attached to an upper position of the shaft 13a. The disc 13b is disposed concentrically with the shaft 13a at a lower position of the shaft 13a.

The lower clamp ring 14L is mounted on the disc 13b.

The shaft 13s is movable up-and-down relatively to the disc 13b by a lifting and lowering device (not shown). Thus, by moving the shaft 13a downward (toward the disk 13b), the rubber bladder 12 is allowed to expand in the tire radial direction.

The rubber bladder 12 forms a closed interior space by being held by the lower clamp ring 14L and the upper clamp ring 14U.

The second flow path 22 communicates with the interior space formed by the rubber bladder 12 in order to supply a second fluid R2 for inflating the rubber bladder 12 and discharge the second fluid R2 to deflate the rubber bladder 12.

The second flow path 22 comprises a supply port portion 22a for supplying the second fluid R2 to the interior space of the rubber bladder 12, and a discharge port portion 22b for discharging the second fluid R2 from the interior space of the rubber bladder 12.

The supply port portion 22a is connected, via a valve 23a, to a supply flow path 25 which the supplied second fluid R2 flows in.

The discharge port portion 22b communicates with the outside via a valve 23b to discharge the second fluid R2.

In this embodiment, as shown in FIG. 4, the supply port portion 22a is connected, via a valve 23c, to the discharge port portions 18b of the first flow paths 18 of the side mold segments 7U and 7L in order that the heated first fluid R1 whose temperature is increased as a result of passing through the heated side mold segments 7U and 7L, can be supplied to the rubber bladder 12 to recycle the heat.

Incidentally, the flow path between the supply port portion 22a and the discharge port portion 18b may be provided with a pressure rising device such as blower for increasing the pressure of the heated first fluid R1 to facilitate the inflation of the rubber bladder 12, and an accumulator for the heated first fluid R1.

It is preferable that the supply port portion 22a is connected, via a valve 23d, to a bypass flow path 26 which the supplied first fluid R1 flows in, without passing through the side mold segments 7U and 7L in order that the interior space of the rubber bladder 12 can be supplied with the first fluid R1 directly from the supply device T and/or indirectly through the side mold segments 7U and 7L.

The supply port portion 22a is connected, via a valve 23e, to the above-mentioned heating medium supply source B for supplying the heating medium to the first and second heater parts J1 and J2.

The rubber bladder 12 supplied with the heating medium (high-temperature and pressure steam) can heat the raw tire Ta from the inside thereof.

In this embodiment, as explained above, the heating medium v and the heated first fluid R1 can be used as the second fluid R2.

Figure 5:
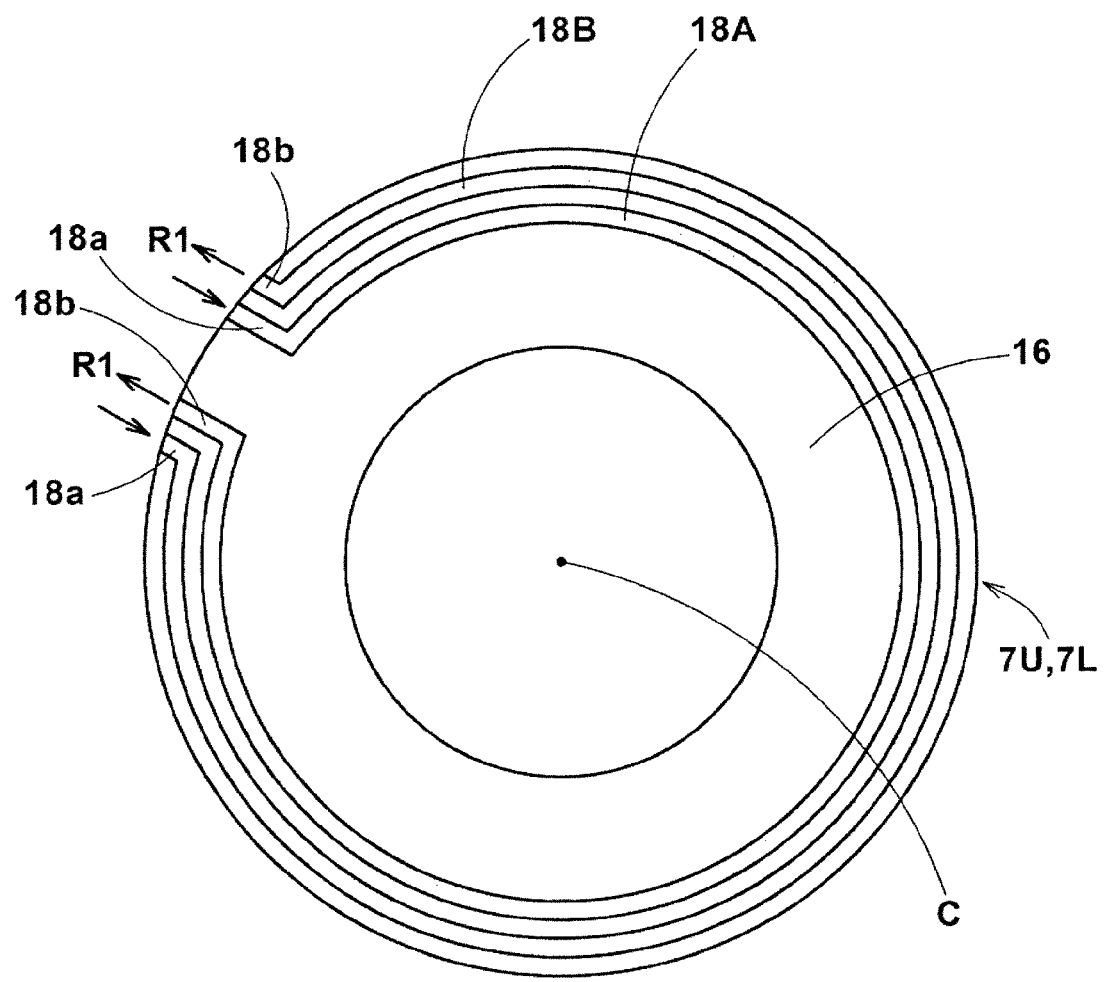
FIG. 5 is a schematic plan view of another example of the side mold segment.

FIG. 5 shows another example of the arrangement of the first flow paths 18 of the upper and lower side mold segments 7U and 7L, wherein each of the side mold segments 7U and 7L is provided with a plurality of parallel flow paths 18—in this example, two parallel flow paths 18 (a radially inner flow path 18A and a radially outer flow path 18B) are provided.

Further, in this example, the flow direction of the radially inner flow path 18A is opposite to the flow direction of the radially outer flow path 18B, and accordingly, two supply port portions 18a and two discharge port portions 18b are provided. When each side mold segment 7U, 7L is provided with the plural flow paths 18, by using the plural flow paths 18 selectively, the cooling area can be increased and decreased according to the radial positions of rubber compounds and reinforcing cord layers used in the tire sidewall portion.

While detailed description has been made of specific embodiments of the present invention, the specific embodiments should not be construed as to limit the scope of the present invention; the present invention may be embodied in various forms.

REFERENCE SIGNS LIST 1 tire vulcanizing apparatus
7 side mold segment
15 side-shaping-face
16 face not serving for shaping
18 first flow path
18a supply port portion
18b discharge port portion
J1 heater part
R1 first fluid
Ta raw tire

The invention claimed is:

1. An apparatus for vulcanizing a raw tire comprising:
a side mold segment provided with a side-shaping-face for shaping an outer surface of a sidewall portion of the raw tire, and a face being opposite to the side-shaping-face and not serving for shaping, and
a heater part for vulcanizing the raw tire, the heater part disposed adjacently to the side mold segment to heat the raw tire abutting on the side-shaping-face from the side of the face not serving for shaping,
wherein the side mold segment is provided with a flow path comprising a supply port portion for being supplied with a first fluid whose temperature is lower than a vulcanization temperature of the raw tire, a discharge port portion for discharging the first fluid, and a main portion extending between the supply port portion and the discharge port portion,
said apparatus further comprising:
a rubber bladder which is inflatable to shape an inner surface of the raw tire, and
a supply path which is for supplying to the rubber bladder a second fluid for inflating the rubber bladder, and to which the discharge port portion is connected.

2. The tire vulcanizing apparatus according to claim 1, wherein
the main portion of the flow path extends circumferentially of the tire along the side-shaping-face.

3. The tire vulcanizing apparatus according to claim 1, wherein
the flow path is formed by a groove denting from the face not serving for shaping toward the side-shaping-face.

4. The tire vulcanizing apparatus according to claim 2, wherein
the flow path is formed by a groove denting from the face not serving for shaping toward the side-shaping-face.

* * * * *